United States Patent [19]

Hagiwara et al.

[11] 3,962,383
[45] June 8, 1976

[54] METHOD AND APPARATUS FOR MANUFACTURING SEAMLESS MATERIAL-FILLED CAPSULES

[76] Inventors: Yoshiro Hagiwara, 1-30-710 Agenaruo, Nishinomiya, Hyogo; Toshiyuki Suzuki, 7-6-104 Higashi Sonoda, Amagasaki, Hyogo; Akira Imai, 4-20-5 Oimazato Higashinari, Osaka, all of Japan

[22] Filed: Apr. 9, 1973

[21] Appl. No.: 349,400

[30] Foreign Application Priority Data
Oct. 3, 1972  Japan.............................. 47-99300

[52] U.S. Cl................................ 264/4; 252/316; 252/359 R; 425/5
[51] Int. Cl.²..................... B29C 13/00; B29F 5/00
[58] Field of Search............. 252/316, 359 R; 264/4; 117/100 A; 425/5

[56] References Cited
UNITED STATES PATENTS

| | | | |
|---|---|---|---|
| 2,339,114 | 1/1944 | Scherer.................................. | 264/4 |
| 2,766,478 | 10/1956 | Raley, Jr. et al...................... | 264/4 |
| 3,423,489 | 1/1969 | Arens et al. ........................... | 264/4 |
| 3,623,997 | 11/1971 | Powell ................................ | 252/316 |

FOREIGN PATENTS OR APPLICATIONS

| | | | |
|---|---|---|---|
| 762,700 | 12/1956 | United Kingdom..................... | 264/4 |

*Primary Examiner*—Richard D. Lovering
*Attorney, Agent, or Firm*—Robert E. Burns; Emmanuel J. Lobato; Bruce L. Adams

[57] ABSTRACT

This invention relates to a method and apparatus for manufacturing seamless material-filled capsules characterized by the fact that a capsule filler material, a sol solution and a water-insoluble solution in the form of a continuous jet are fed from a triple orifice of the same core into a stream of hardening solution, the spherical drops consisting of the above mentioned three layers are completed due to their interfacial surface tensions, then said water-soluble solution of said outermost layer is caused to strike several interrupting plates to have said water insoluble layer destroyed and separated from the sol solution as a second layer to react said sol solution with said hardening solution at this instant for forming a water-insoluble film and the diameter the wall thickness of said spherical drop can be changed easily by modifying the flow speed of the hardening solution and the diameter of said orifice.

8 Claims, 2 Drawing Figures

METHOD AND APPARATUS FOR MANUFACTURING SEAMLESS MATERIAL-FILLED CAPSULES

BACKGROUND OF INVENTION

In manufacturing seamless material-filled capsules heretofore, it has been the practice that since a sol solution of alginic acid salt, low methoxyl-pectin, pectic acid salt, cellulose glycollic acid salt or polyacrylate salt is liable to decrease its hydration by the action of acids and/or said sol solution has the property of forming an elastic and irreversible gel of reticular construction by reacting a multivalent metal ion in combination, according to the conventional methods of producing material-filled capsule agents of mm grade by utilizing a method of forming outlayer films to be hardened in a solution as as mentioned above.

Such methods are already well known.

However, according to these conventional methods, it has been found difficult to adjust the diameter and wall thickness of the spherical capsule drop so that it has been also difficult to obtain uniform capsules with a satisfactory percentage of yield.

Now in view of the technical difficulty with which seamless material-filled capsules have been manufactured by the above mentioned conventional methods, it is here that the applicant has exploited a method of manufacturing uniform capsules with a sufficient yield, capable of adjusting easily the spherical diameter and wall thickness of the capsule along with its ensured spherical formation and an apparatus for such a purpose.

BRIEF SUMMARY OF THE INVENTION

The primary object of the present invention resides in providing a method of manufacturing seamless material-filled capsules, comprising a first step wherein a capsule filler material, a sol solution and a water-insoluble solution in the form of a continuous jet of the same core are fed into a stream of hardening solution composed of a solution of an acid or a multi-valent metal ion through core and the outermost layer (third layer) of the capsule jet is made water-insoluble at the instant of its coming into contact with the hardening solution so that the spherical formation of the outermost layer of the spherical drops can be achieved perfectly, due to interfacial tensions, without bringing the sol solution into direct contact with the hardening solution at the outlet of the orifice and then these spherical drops are caused to strike interrupting plates to break the outermost layer and to separate it from the intermediate layer (second layer) of the spherical drops.

The second object of the invention resides in providing a method of manufacturing material-filled capsules, comprising a second step wherein the intermediate layer (the second layer) sol solution exposed after the destruction of the outermost layer and the separation of the same from the second layer is caused to react with the hardening solution directly at this instant to form a water-insoluble film on the surface of the spherical drops.

Still, the third object of the invention resides in providing a method of manufacturing seamless material-filled capsules, capable of freely changing the spherical diameter and film thickness of the spherical drops by changing the flow speed of the hardening solution and the diameter of the triple-orifice. Still further, the fourth object of the invention resides in providing an apparatus for carrying out the manufacture of the above mentioned seamless material-filled capsules. Next, the substantial import and mechanism of the present invention for achieving the above mentioned objects will be explained hereinafter.

Namely, the three kinds of solution, i.e. a solution of a capsule filler material, a sol solution and a water-insoluble solution in the form of a continuous jet of the same core are fed from a triple-orifice of the same core into a stream of hardening solution consisting of a solution of an acid or multi-valent metallic ion and the third layer of the above mentioned three solutions in direct contact with the hardening solution is made water-insoluble so that the spherical formation of three layered spherical drops, by interfacial tension, can be accomplished without contacting the hardening solution and the sol solution at the outlet of the orifice. After that the third layer of the spherical drops is caused to strike interrupting plates in the hardening solution to destroy the third layer and to separate it from the second layer.

The sol solution as, the second layer, thus exposed is caused to react with the hardening solution at this instant to form a waterinsoluble film on the surfaces of spherical drops. The spherical diameter and the thickness of the films can be changed at will by adjusting the diameter of the orifices and the flow speed of the hardening solution as substantially characteristic of the present invention.

DETAILED DESCRIPTION

Figure 1:
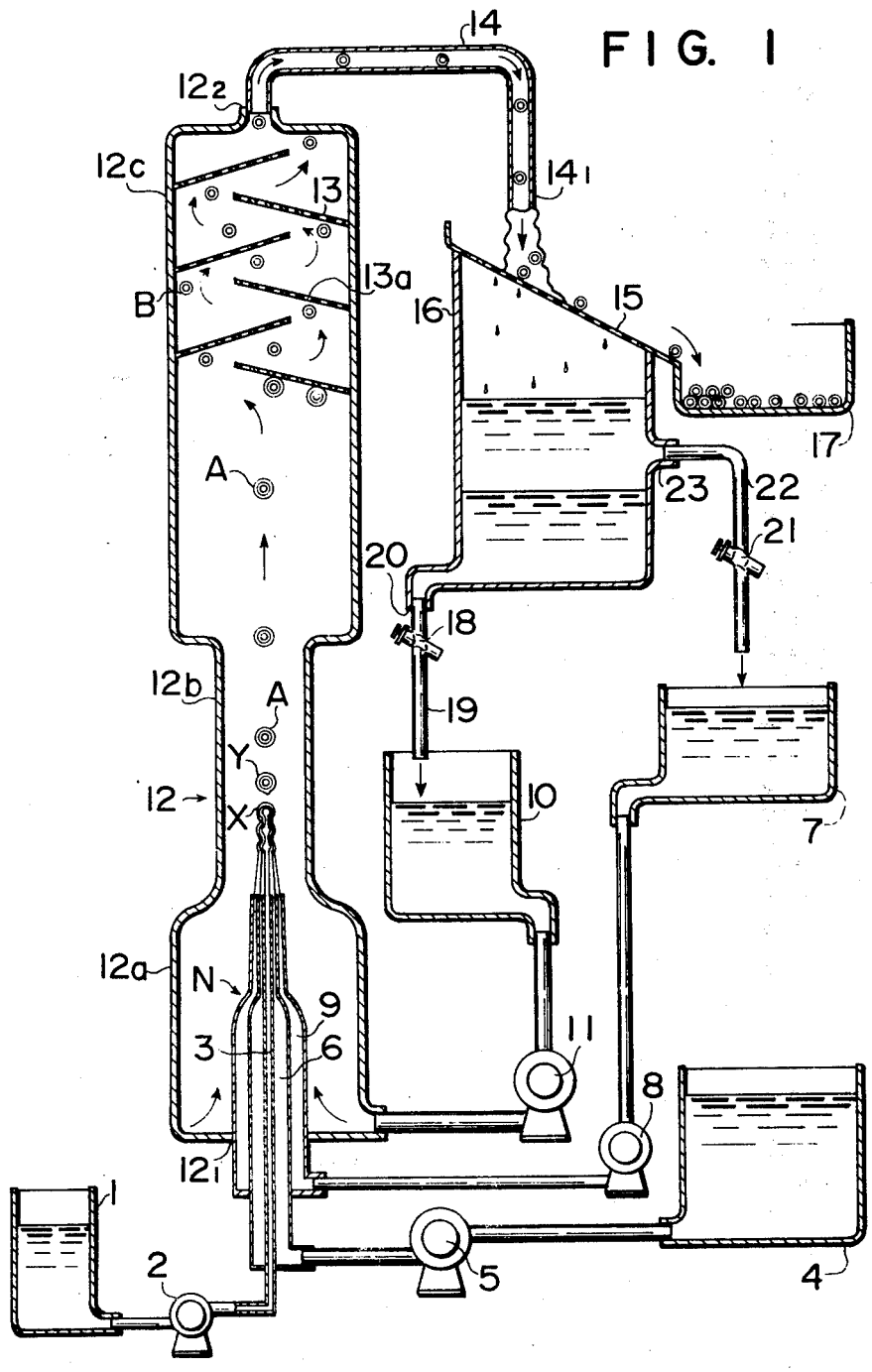
FIG. 1 is a schematic view showing an apparatus for manufacturing seamless material-filled capsules, according to the present invention.

The above mentioned objects and characteristics of the present invention will be understood in more detail by showing a preferred embodiment with reference to the apparatus and mechanism shown in the accompanying drawings.

In the drawings there is shown a triple-orifice N of the same core consisting of an innermost pipe 3 connected to a reservoir 1 of a capsule filler material by means of a pipe through a pump 2 for feeding predetermined amounts of the filler material, an intermediate pipe 6 disposed around the outer side of said innermost pipe 3 and connected to a tank 4 for storing a sol solution by means of a pipe through a pump 5 for feeding predetermined amounts of the sol solution, and moreover, an outermost pipe 9 disposed around the outer side of said intermediate pipe 6 and connected to a tank 7 for storing a water-insoluble solution by means of a pipe through a pump 8 for feeding predetermined amounts of the water-insoluble solution.

The triple-orifice N of the same core is provided in the lower chamber $12a$ from the lowest $12_1$ of the tower 12 for capsuledrop forming and hardening purposes, said lower chamber $12a$ being connected to a tank 10 for storing a hardening solution by means of a pipe to feed it through a pump 11 for feeding predetermined amounts of the hardening solution.

At the same time, the provision of said triple-orifice N is made in such a manner that the jet opening thereof is positioned upwardly at the lower end of the cylinder 12b for forming capsule drops.

In the inner wall surface of the upper chamber 12c of said tower 12 are provided a plurality of interrupting plates 13 in a staggered manner for contact purposes of spherical drops A such that the above three solutions, after being fed into the hardening solution from the triple-orifice N are formed into spherical drops A. Which are adapted to pass among said interrupting plates while the spherical drops in contact therewith are allowed to float and ascend upwardly, by the way, several holes 13a formed in each interrupting plate 13.

The upper chamber 12c of said tower 12 for forming and hardening capsules is provided with an opening portion $12_2$, through which the spherical capsule drops B can be discharged from the upper chamber 12c. In this opening portion $12_2$ is inserted a feed pipe 14 the other end of which is bent downward.

Beneath the outlet $14_1$ of this feed pipe 14 is provided a multi-hole catch plate such that the spherical capsule drops B only can roll thereon and the hardening solution and the water-insoluble solution are adapted to drop down through the holes of said catch plate. This catch plate serving as a lid, is attached to a recovering tank 16, the upper part of which is inclined.

Adjacent to said recovering tank 16 is provided a container 17 for storing the finished seamless material-filled capsules, said multi-hole catch plate 15 being extended to the wall of the container 17 to engage the latter.

At the bottom of said recovering tank 16 is provided a water-discharge outlet 20 in which a pipe 19 with a cock 18 is inserted, its lower end confronting the tank 10 for storing the hardening solution.

In a side-wall portion of said recovering tank 16 is provided a water insoluble solution discharge outlet 23 in which a pipe 22 with a cock 21 is inserted, the lower end opening of said pipe facing over the tank 7 for storing the water-insoluble solution.

As has already been explained, the lower chamber 12a is formed in the lower part of the capsule drop forming cylinder 12b and the upper chamber 12c is disposed as connected to the upper part of said cylinder 12b. In this case, the internal diameter of the lower chamber 12a is made larger than that of the capsule-drop forming cylinder 12b and the internal diameter of the upper chamber 12c also made larger than that of said cylinder 12b.

While the construction of the present apparatus has been explained in detail hereinbefore, a preferred embodiment is offered to explain the method of manufacturing seamless material-filled capsules in detail using the present apparatus according to the present invention.

In this preferred embodiment, purified vegetable oil was used as a capsule filler material; sodium alginate 1.6%, polyvinyl alcohol 3.0%, gelatine 1.0%, glycerine 4.4% and purified water 90% was used as the sol solution in this preferred embodiment.

The water-insoluble solution used was liquid paraffin, and the hardening solution for use was an aqueous solution of 10% calcium chloride.

Figure 2:
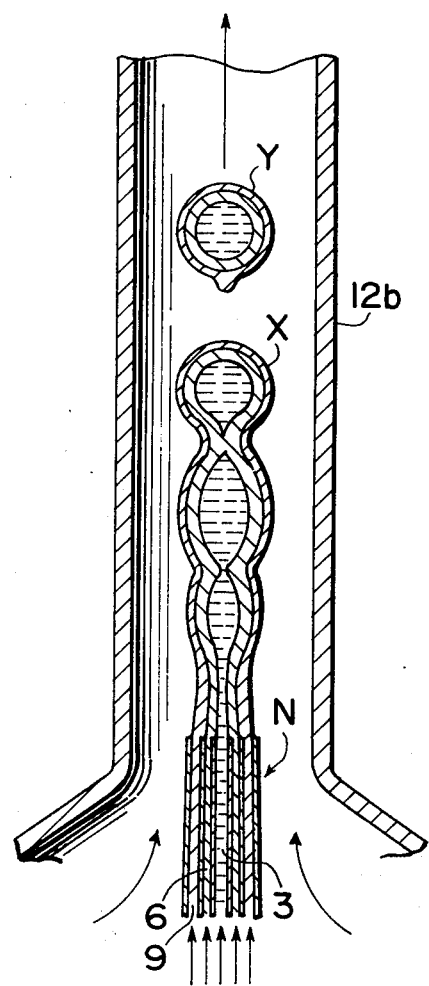
FIG. 2 is an enlarged view in part showing a triple-orifice of the same core provided in the lower chamber of a tower for capsule forming and hardening purposes, this view showing how spherical drops are formed and separated from a continuous jet of the same core.

First of all, refined vegetable oil as a capsule filler material contained in the tank 1 was jetted through the innermost pipe 3 by means of the pump 2 for feeding a predetermined amount of the purified vegetable oil and as a sol solution, the mixture of sodium alginate 1.6%, polyvinyl alcohol 3.0%, gelatine 1.0%, glycerine 4.4% and purified water 90% was jetted through the intermediate pipe 6 around the innermost pipe 3 and liquid paraffin as a water-insoluble solution was jetted through the outermost pipe 9 around the intermediate pipe 6 whereby multilayered continuous jet of the same core was caused to jet from the triple-orifice N of the same core and was discharged into the capsule-drop forming cylinder 12b of the tower 12 for capsule-drop forming and hardening purpose. An aqueous solution of 10% calcium chloride is adapted to flow upwards through tower 12 at definite speeds with the result that, due to interfacial tension between said multilayered jet and the aqueous solution of 10% calcium chloride, the vegetable oil jetted from the innermost pipe 3 becomes a component of the content of said multilayered jet and this component is enclosed in the sol solution jetted from the intermediate pipe 6 consisting of said sodium alginate, polyvinyl alcohol, gelatine, glycerine and purified water and then the sol solution enclosing said vegetable oil as the active component is enclosed in the liquid paraffin jetted from the outermost pipe 9, thereby forming a constricted portion X at the top of said jet assembly. Thereafter, this constricted portion X becomes a separated drop Y which is adapted to float up in the capsule-forming cylinder 12b. The separated drop Y is destined to continue its spherical formation before it reaches the upper chamber 12c. Tower 12 is of such length, that it is possible to obtain a spherical drop of the three layers of the same core. (See FIG. 2)

The spherical drop A of the three layers is continues ascending while floating in the hardening solution of 10% calcium chloride flowing up at definite speeds in the upper chamber 12 c and is caused to rise up and pass among six interrupting plates 13 formed with many piercing holes 13a respectively while said spherical drop hits said six interrupting plates 13 which are secured to the internal wall surface in the upper part of said upper chamber 12c.

At the instant that the spherical drop A of the three layers, hits the interrupting plates 13, its outermost layer, i.e. the layer of liquid paraffin is destroyed and separated. That is to say, the spherical drop A occurs in such condition as one shell is taken off so that the second layer (intermediate layer) consisting of sodium alginate, polyvinyl alcohol, gelatine and glycerine as the sol solution is allowed to come in direct contact with the aqueous solution of calcium chloride as the hardening solution, whereby both these solutions begin to react at this point of time to form a water-insoluble film of calcium alginate.

Namely, it is here that a perfect, seamless and materialfilled capsule B, can be obtained, said capsule B containing the vegetable oil, as its content and its outer layer being enclosed in said film of calcium alginate, as mentioned above.

At this stage, it is very important to control the flow speed of the hardening solution, i.e. the aqueous solution of 10% calcium chloride which is kept on flowing from below to upward in the tower 12 for capsule-drop forming and hardening purposes.

In effect, it is possible to adjust at will the diameter of the continuous jet of the three layers by changing the above mentioned flow speed of the hardening solution, which accounts for the fact that it is rendered possible to manufacture material-filled capsules within the range from spherical diameters approx. 1mm – 7mm by one orifice and at the same time, the thickness of the film of the capsule can be made uniform when manufacturing it.

While the methods and apparatus for manufacturing seamless material-filled capsules have been explained in detail according to the present invention hereinbefore, the invention is not limited to the above-mentioned explanation and embodiment but it is possible that various improvements and modifications are attainable without departing from the spirit of the present invention.

For the sake of reference, experimental results obtained by the preferred embodiment of the present invention will be shown in the following table.

Table

| Lot No.<br>Item | 1 | 2 | 3 | 4 | 5 | 6 | 7 |
| --- | --- | --- | --- | --- | --- | --- | --- |
| Spherical diameter apiece (mm) (capsule) | 1.0 | 2.0 | 3.0 | 4.0 | 5.0 | 6.0 | 7.0 |
| Weight of capsule apiece (mg) | 0.5 | 3.9 | 13.1 | 31.4 | 60.8 | 105.1 | 166.9 |
| Flow amount of filler material (g/min) | 18.0 | 18.0 | 18.0 | 18.0 | 18.0 | 18.0 | 18.0 |
| Flow amount of sol solution (g/min) | 7.0 | 7.0 | 7.0 | 7.0 | 7.0 | 7.0 | 7.0 |
| Flow amount of water-insoluble solution (g/min) | 280 | 117 | 60 | 40 | 30 | 24 | 18 |
| Flow amount of hardening solution (g/min) | 29,000 | 7,300 | 3,300 | 1,800 | 1,200 | 800 | 600 |

In the apparatus of the present invention, the solution delivered from the feed pipe 14 of the tower 12 is adapted to drop downwardly through the multi-hole catch plate 15 disposed on the upper part of the recovering tank 16 so that it can remain as recovered in the recovering tank 16.

Then, due to a difference in specific gravity, the waterinsoluble solution remains in the upper part of the recovering tank 16 and the hardening solution remains in the lower part thereof, that is to say, both solutions are allowed to remain in two different layers.

Therefore, the hardening solution is allowed to flow into the tank 10 for storing it from the water-discharge outlet 20 at the bottom of the tank 16 on one hand and on the other hand, the waterinsoluble solution is allowed to return to the tank 7 for storing it from the water-discharge outlet 23 of the side wall of the tank 16 through the pipe 22, thereby enabling all the solutions to be recovered without waste.

As has been explained above, the method and apparatus for manufacturing seamless material-filled capsules relating to the present invention are effective in adjusting the diameter and the film thickness of each capsule easily and obtaining uniform capsules with a sufficient percentage of yield, which has never been achieved by the conventional methods heretofore.

It is certainly possible to manufacture useful and material-filled capsules with their spherical diameters, approx. 1 mm and more by changing the flow speed of the hardening solution and the diameter of the orifice so that the finished capsules can have different spherical diameters and thicknesses of their film in an easy manner.

The operation of the present apparatus is easy to carry out for manufacturing seamless material-filled capsules without waste very effectively to obtain the desired purpose satisfactorily.

What is claimed is:

1. A method of manufacturing seamless material-filled capsules, comprising the steps of jetting a capsule filler material, a sol solution and a water-insoluble solution in the form of a continuous jet of the same core into a hardening solution from a triple-orifice of the same core when the outermost layer (third layer) of said jet, in direct contact with said hardening solution, is a water-insoluble solution so that the spherical formation of the said jet three layers due to interfacial tension can be completed without contacting of said hardening solution and said sol solution directly at the outlet of said triple-orifice, and causing the resultant three-layered spherical drop to strike a plurality of interrupting plates in the hardening solution to destroy and separate said water-insoluble outermost layer so that the sol solution as the intermediate layer (second layer) thus exposed can then react with said hardening solution to form a water-insoluble film on the outer surface of the spherical drop, and controlling and changing the diameter and film thickness of the spherical drop by changing the flow speed of said hardening solution and the diameter of said triple-orifice.

2. The method of manufacturing seamless material-filled capsules, as claimed in claim 1, wherein said hardening solution consists of a solution of an acid or multi-valent metallic ion.

3. The method of manufacturing seamless material-filled capsules, as claimed in claim 1, wherein the flow of said hardening solution is an ascending flow.

4. An apparatus for manufacturing seamless material-filled capsules, comprising a triple-orifice of the same core consisting of an innermost pipe connected by means of a pipe to a tank for storing a capsule filler material, an intermediate pipe connected by means of a pipe to a tank for storing a sol solution, and an outermost pipe connected by means of a pipe to a tank for storing a water-insoluble solution, all of said innermost, intermediate and outermost pipes being connected to respective pumps for feeding predetermined amounts of said respective solutions, and a tower containing hardening solution for capsule-drop forming and hardening purposes, in which said triple-orifice is arranged in the lower chamber thereof with the jet opening of said triple-orifice positioned upwardly, and a plurality of interrupting plates for contact with spherical drops from said orifice being provided in the upper chamber of said tower.

5. An apparatus, as claimed in claim 4, including a feed pump for the purpose of causing said hardening solution to make an ascending flow in said tower.

6. An apparatus, as claimed in claim 4 wherein a plurality of said interrupting plates are provided in an alternatively inclined manner.

7. An apparatus, according to claim 4 wherein said tower for capsule-drop forming and hardening purposes consists of a lower chamber thereof for providing said triple-orifice of the same core, a capsule-drop forming cylinder of an internal diameter smaller than that of said lower chamber having said triple-orifice of the same core arranged at its lower portion, an upper chamber provided adjacent said capsule-drop forming cylinder and having said interrupting plates provided therein.

8. An apparatus according to claim 4, wherein there is provided a recovery tank and a feed pump in order that said hardening solution and said water-insoluble solution may be separated and reused.

* * * * *